US008478654B2

(12) United States Patent
Ikeda

(10) Patent No.: US 8,478,654 B2
(45) Date of Patent: Jul. 2, 2013

(54) INFORMATION PROVIDING DEVICE, METHOD, AND SYSTEM

(75) Inventor: Yuuichirou Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/360,478

(22) Filed: Jan. 27, 2012

(65) Prior Publication Data
US 2012/0246030 A1 Sep. 27, 2012

(30) Foreign Application Priority Data
Mar. 25, 2011 (JP) ................................. 2011-066971

(51) Int. Cl.
*G06Q 30/00* (2012.01)
(52) U.S. Cl.
USPC ....................................................... 705/26.1
(58) Field of Classification Search
USPC ....................................................... 705/26.1
See application file for complete search history.

(56) References Cited

U.S. PATENT DOCUMENTS

2012/0191536 A1\* 7/2012 Chen et al. ................. 705/14.49
2012/0296866 A1\* 11/2012 Doddavula et al. ........... 707/609

FOREIGN PATENT DOCUMENTS

| JP | 2002-189852 A | 7/2002 |
| JP | 2003-022395 A | 1/2003 |

\* cited by examiner

*Primary Examiner* — Mila Airapetian
(74) *Attorney, Agent, or Firm* — Maschoff Brennan

(57) ABSTRACT

A device executes a program including a process stored in a storage device. The process includes obtaining possessed product information of a possessed product of a user, and usage status information which indicates usage of the possessed product, the process product information being based on a request from the user device, obtaining first product information corresponding to the obtained possessed product information and a second product information of a comparison target product, the first product information and the second product information including a content of the possessed product and the comparison target described in a plurality of items, respectively, extracting a prescribed item from among the items of the first product information and second product information based on the obtained usage status information, and transmitting the content based on the content of the first product information and second product information corresponding to the extracted item to the user device.

15 Claims, 21 Drawing Sheets

FIG. 4

| PRODUCT NAME | FMV1 | FMV2 | FMV3 | |
|---|---|---|---|---|
| TYPE NAME | FMVzzzzzzzz | FMVyyyyyyyy | FMVaaaaaaaa | |
| RELEASE TIME | ...... | ...... | ...... | |
| CPU | ...... | ...... | ...... | |
| MEMORY | ...... | ...... | ...... | |
| HDD | ...... | ...... | ...... | |
| OPTICAL DRIVE | ...... | ...... | ...... | |
| DISPLAY | ...... | ...... | ...... | |
| SIZE (W × D × H) | ...... | ...... | ...... | |
| START-UP TIME | ...... | ...... | ...... | |
| ⋮ | ⋮ | ⋮ | ⋮ | |

FIG. 6

| CLIENT ID | PRODUCT NAME | TYPE NAME |
|---|---|---|
| xxxxx01 | FMV1 | FMVzzzzzzzz |
| xxxxx02 | FMV8 | FMVaaaaaaaa |
| ⋮ | ⋮ | ⋮ |

FIG. 8

| TIME AND DATE | CLASSIFICATION | TARGET | OPERATION |
|---|---|---|---|
| 2010/927 17:05:02 | SYSTEM EVENT | REMOVABLE MEDIA | INSERT |
| 2010/927 17:08:31 | SYSTEM EVENT | IMAGE EDITING APPLICATION A | START-UP |
| 2010/927 17:10:41 | SYSTEM EVENT | FILE | OPEN JPEG FILE |
| 2010/927 17:15:41 | APPLICATION EVENT | IMAGE EDITING APPLICATION A | PERFORM RESIZING PROCESSING |
| ... | ... | ... | ... |
| 2010/927 18:00:00 | SYSTEM CONSTANT MONITORING | MEMORY | 2.4 GB 60% USE |
| 2010/927 18:00:00 | SYSTEM CONSTANT MONITORING | HDD | 42.5 GB 27% USE |
| 2010/927 18:00:00 | SYSTEM CONSTANT MONITORING | MY DOCUMENT | 3,546 IMAGE FILES |
| 2010/927 18:00:00 | SYSTEM CONSTANT MONITORING | NETWORK | LAN CONNECTING SPEED 100 Mbps |
| 2010/927 18:10:00 | APPLICATION MONITORING | IMAGE EDITING APPLICATION A | MEMORY 117 MB USE HDD 645 MB USE |
| 2010/927 18:15:00 | NETWORK MONITORING | INTERNET BROWSER B | ACCESS TO MAIL |

FIG. 9

| TIME AND DATE | CLASSIFICATION | QUESTION | TARGET | ANSWER |
|---|---|---|---|---|
| 2010/927 17:05:02 | IMAGE PROCESSING SOFTWARE | USE FUNCTION | RESIZE | ALWAYS USE |
| 2010/927 17:08:31 | IMAGE PROCESSING SOFTWARE | USE FUNCTION | ADJUST BRIGHTNESS | RARELY USE |
| 2010/927 17:10:41 | IMAGE PROCESSING SOFTWARE | SATISFACTION LEVEL | SPEED | BAD |
| 2010/927 17:15:41 | PC MAIN UNIT | SATISFACTION LEVEL | DISPLAY QUALITY | VERY GOOD |
| ... | ... | ... | ... | ... |

FIG. 13

| | | MEMORY USE AMOUNT | |
|---|---|---|---|
| | | 4 GB OR MORE | 2 GB OR MORE | LESS THAN 2 GB |
| CPU USE AMOUNT | 70% OR MORE | PRODUCT A (HIGH PERFORMANCE) | | PRODUCT B (SPECIFIED CPU) |
| | 40% OR MORE | PRODUCT C (SPECIFIED MEMORY) | PRODUCT D (MIDDLE PERFORMANCE) | |
| | LESS THAN 40% | PRODUCT E (LOW PERFORMANCE) | | PRODUCT F (LOW PERFORMANCE, CHEAPER VERSION) |

FIG. 14

| | CLASSIFICATION | QUESTION |
|---|---|---|
| PRODUCT NAME | FMV1 | FMV8 |
| TYPE NAME | FMVzzzzzzz | FMVxxxxxx |
| RELEASE TIME | OCTOBER, 2006 | JANUARY, 2010 |
| CPU | PROCESSOR TYPE X | PROCESSOR TYPE Y |
| | 1.66 GHz | 2.26 GHz |
| MEMORY | NORMAL 1 GB/MAXIMUM 8 GB DUAL CHANNEL DDR2 SDRAM PC2-5300 | NORMAL 4 GB/MAXIMUM 8 GB DUAL CHANNEL DDR3 MEMORY |
| HDD | APPROXIMATELY 100 GB (Ultra ATA/100) | APPROXIMATELY 500 GB (Serial ATA/5400 RPM) |
| OPTICAL DRIVE | SUPER MULTI-DRIVE (DVD±RDL (DOUBLE LAYER) WRITABLE) | Blu-ray Disc Drive (SUPER MULTI-DRIVE FUNCTION) |
| DISPLAY | HIGH BRIGHTNESS AND LOW REFLECTION WITH FL BACKLIGHT TFT COLOR LCD (SUPERFINE LIQUID CRYSTAL) | SUPERFINE LIQUID CRYSTAL (LED BACKLIGHT) |
| | 1280 × 800 DOTS | 1366 × 768 DOTS |
| | 15.4-INCH WIDE | 15.6-INCH WIDE |
| SIZE (W × D × H) | 360 × 265 × 33.0~37.7 mm | 372 × 260.3 × 37.8~45.5 mm |
| START-UP TIME | 45 SECONDS | 25 SECONDS |
| ... | ... | ... |

FIG. 16

| | PRODUCT POSSESSED BY CUSTOMER | QUESTION |
|---|---|---|
| PRODUCT NAME | FMV1 | FMV8 |
| CPU | PROCESSOR TYPE X | PROCESSOR TYPE Y |
| | 1.66 GHz | 2.26 GHz |
| MEMORY | ORMAL 1 GB/MAXIMUM 4 GB DUAL CHANNEL DDR2 SDRAM PC2-5300 | ORMAL 4 GB/MAXIMUM 8 GB DUAL CHANNEL DDR3 MEMORY |
| DISPLAY | HIGH BRIGHTNESS AND LOW REFLECTION WITH FL BACKLIGHT TFT COLOR LCD (SUPERFINE LIQUID CRYSTAL) | SUPERFINE LIQUID CRYSTAL (LED BACKLIGHT) |
| | 1280×800 DOTS | 1366 × 768 DOTS |
| | 15.4-INCH WIDE | 15.6-INCH WIDE |

FIG. 19

| POSSESSED PRODUCT | COMPARISON TARGET PRODUCT | COMPARISON TEXT |
|---|---|---|
| PROCESSOR TYPE X | PROCESSOR TYPE Y | APPROXIMATELY 1.5 TIMES FASTER! |
| PROCESSOR TYPE X | PROCESSOR TYPE Z | APPROXIMATELY 2 TIMES FASTER! |
| ⋮ | ⋮ | ⋮ |

FIG. 21

| | PRODUCT POSSESSED BY CUSTOMER | QUESTION | COMPARISON |
|---|---|---|---|
| PRODUCT NAME | FMV1 | FMV8 | 4 COLORS |
| CPU | PROCESSOR TYPE X | PROCESSOR TYPE Y | APPROXIMATELY 1.5 TIMES FASTER! |
| | 1.66 GHz | 2.26 GHz | |
| MEMORY | ORMAL 1 GB/MAXIMUM 4 GB DUAL CHANNEL DDR2 SDRAM PC2-5300 | ORMAL 4 GB/MAXIMUM 8 GB DUAL CHANNEL DDR3 MEMORY | 4 TIMES! TWO TIMES FASTER! YOU CAN OPEN MANY LARGE-SIZE IMAGE FILES! |
| DISPLAY | HIGH BRIGHTNESS AND LOW REFLECTION WITH FL BACKLIGHT TFT COLOR LCD (SUPERFINE LIQUID CRYSTAL) | SUPERFINE LIQUID CRYSTAL (LED BACKLIGHT) | BEAUTIFUL PHOTOS! |
| | 1280×800 DOTS | 1366 × 768 DOTS | |
| | 15.4-INCH WIDE | 15.6-INCH WIDE | |

INFORMATION PROVIDING DEVICE, METHOD, AND SYSTEM

CROSS-REFERENCE TO RELATED APPLICATIONS

This application is based upon and claims the benefit of priority from the prior Japanese Patent Application No. 2011-066971 filed on Mar. 25, 2011, the entire contents of which are incorporated herein by reference.

FIELD

The embodiments discussed herein are related to a technique for transmitting, to a user device of a user, information of a possessed product possessed by the user and information of a comparison target product comparable to the possessed product.

BACKGROUND

In general, when information of a product is provided by an introduction of merchandise and by product catalogs in shopping services, specification information that includes contents of the product such as functions and performances of the product is provided. The specification information represents details of types of components and processing speeds of the product by using letters and numbers. Therefore, if a user does not have technical knowledge on the product in the shopping service, it is difficult for the user to properly understand advantages of the product by referring to the specification information. Furthermore, when the user replaces the product (possessed product) with another product, it is difficult for the user to compare the possessed product with another product by referring to the specification information of the other product unless the user understands the content in detail of the specification information of the product. Accordingly, the user does not readily understand improvements and differences of the other product based solely on the specification information of the other product which is provided. This makes it difficult for product providers to improve appealing aspects or advantages of the other product. As disclosed by examples of the prior art, Japanese Laid-open Patent No. 2002-189852 and Japanese Laid-open Patent No. 2003-022395, there is a technique for simultaneously displaying the information of the possessed product of the user and the information of another product as a comparison target product of the possessed product. According to this technique, the information of the possessed product of the user and the information of the comparison target product are represented in items of the functions and performances of each of the products. This enables the user to compare the products by referring to the information of each of the products.

The above-described technique simply presents a list of the information of the comparison target product and the information of the possessed product. Therefore, for example, when the information of an electronic apparatus with various functions and performances such as a personal computer and a mobile phone is provided, the number of items of the functions and performances on the list is increased. Accordingly, when the user compares the possessed product with the comparison target product, it is difficult for the user to decide which item on the list to use for the comparison. As a result, since the user does not easily understand the improvements and differences of the comparison target product as compared to the possessed product, it is difficult for the user to properly observe or identify any improvements or advantages of the comparison product.

SUMMARY

According to an aspect of an embodiment, an information providing device includes a communication device, a storage device and a processing circuit which executes a program including a process stored in the storage device. The process includes obtaining a possessed product information, which indicates a possessed product of a user, and a usage status information, which indicates a usage status of the possessed product, the possessed product information being obtained based on a request received from the user device operated by the user through the communication device, obtaining a first product information corresponding to the obtained possessed product information and a second product information of a comparison target product as a target of comparison of the possessed product, the first product information and the second product information including a content of the possessed product and a content of the comparison target product described in a plurality of items, respectively, extracting a prescribed item from among the items of the first product information and second product information based on obtained usage status information, and transmitting comparison content based on the content of the first product information and the content of the second product information corresponding to the extracted item to the user device.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the various embodiments.

BRIEF DESCRIPTION OF DRAWINGS

FIG. 4 is an example of a data configuration of product information according to the first embodiment;

FIG. 6 is an example of the data configuration of purchased product information according to the first embodiment;

FIG. 8 is an example of the data configuration of usage status information according to the first embodiment;

FIG. 9 is another example of the data configuration of the usage status information according to the first embodiment;

FIG. 13 is an example of a two-dimensional matrix for selecting the comparison target product according to the first embodiment;

FIG. 14 is an example of the product information of the possessed product and the comparison target product according to the first embodiment;

FIG. 16 is an example of the product information of the possessed product and the comparison target product displayed on a display device of the user device according to the first embodiment;

FIG. 19 is an example of the data configuration of comparison text information according to the second embodiment;

FIG. 21 is an example of the product information of the possessed product and the comparison target product displayed on the display device of the user device according to the second embodiment.

DESCRIPTION OF THE EMBODIMENTS

[First Embodiment]

(1-1) System Configuration

Figure 1:
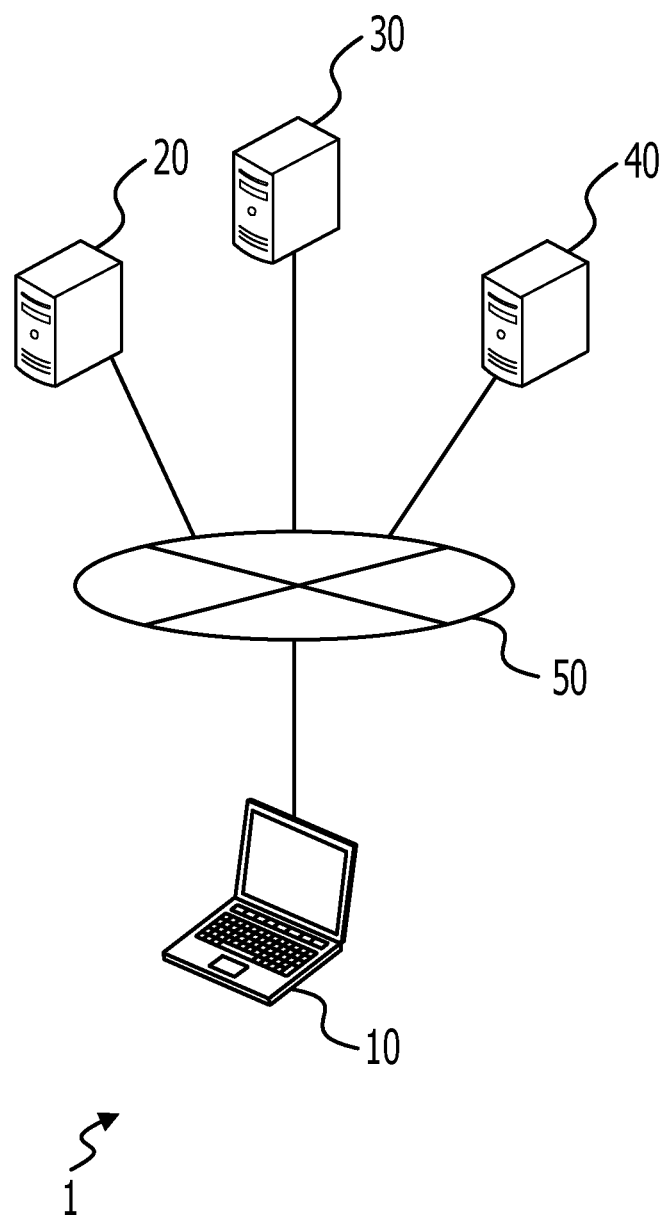
FIG. 1 is an overview of a system using an information providing device according to a first embodiment.

An information providing device, an information providing method, an information providing system, and a program stored in a non-temporal storage medium according to a first embodiment will be described below. FIG. 1 is an overview of a configuration of an information providing system 1 according to the first embodiment. The information providing system 1 includes, for example, a user device 10, a purchased product registering server 20, a usage status collecting server 30, and an information providing server 40. The user device 10 is allocated on a network 50 such as the Internet. The user device 10 is used by a user who uses shopping services and the like provided on the network 50. The purchased product registering server 20 performs processing for registering information of a product purchased by the user. The purchased product registering server 20 is provided in a store selling the product, a manufacturing company of the product, or the like. The usage status collecting server 30 collects usage statuses of the product (possessed product) possessed by the user. The information providing server 40 provides services and the like for providing the shopping service and the information of the product on the network 50. The information providing server 40 is an example of the information providing device. The devices included in the information providing system 1 may communicate with each other through the network 50. The functions of the purchased product registering server 20, the usage status collecting server 30, and the information providing server 40 are not limited to the above-described purposes and may have functions as various servers such as, for example, a web server and a database server. Furthermore, one server may achieve the functions of each of the purchased product registering server 20, the usage status collecting server 30, and the information providing server 40.

The overview of the processing in the information providing system 1 according to the first embodiment will be described. A user purchases the user device 10 and registers the information of the user device 10 on the purchased product registering server 20. When the user uses the user device 10, the usage status of the user device 10 is recorded in the usage status collecting server 30. If the user device 10 accesses the information providing server 40 based on operation of the user, the information of the possessed product (the user device 10) and the information of the comparison target product as a comparison target of the possessed product are transmitted to the user device 10 from the information providing server 40. The user device 10 is not typically the purchased product and/or the possessed product of the user.

(1-2) Configuration of User Device 10

Figure 2:
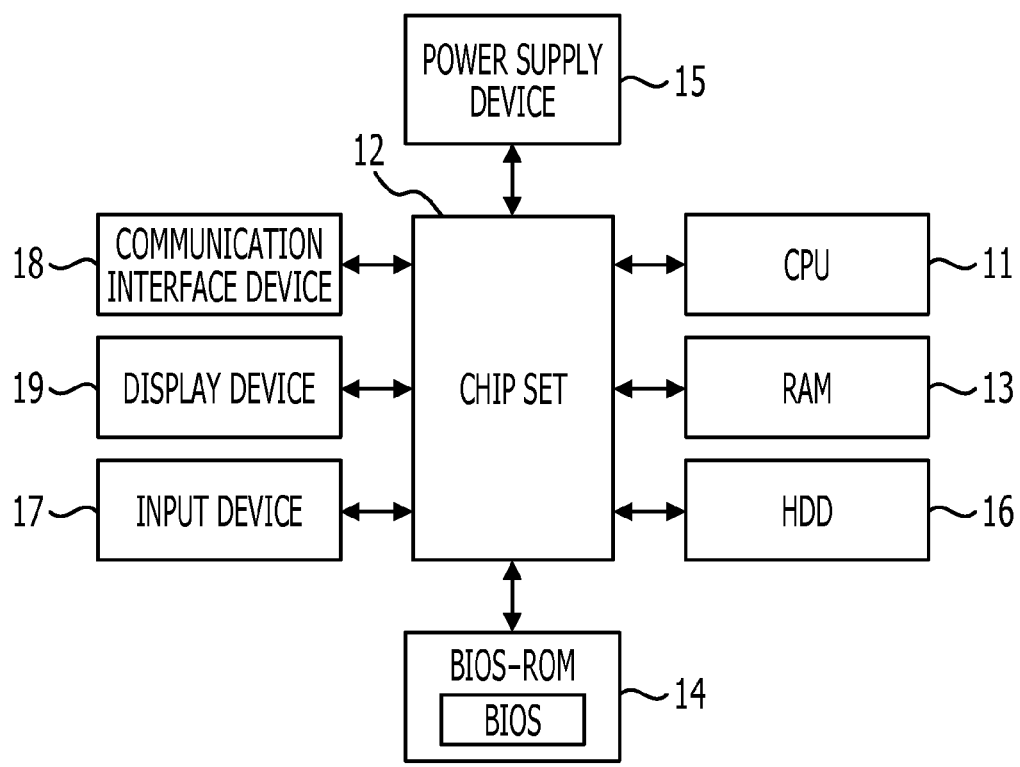
FIG. 2 is a block diagram illustrating a configuration of a user device according to the first embodiment.

FIG. 2 is a block diagram illustrating a configuration of the user device 10 according to the first embodiment. As illustrated in FIG. 2, the user device 10 includes, for example, a Central Processing Unit (CPU) 11, a chipset 12, a Random Access Memory (RAM) 13, a BIOS-ROM 14, a power supply device 15, a Hard Disk Drive (HDD) 16, an input device 17, a communication interface device 18, and a display device 19. By using a data bus and a control bus, the chipset 12 is coupled to be data-communicable with the units inside the user device 10. A general personal computer and a mobile terminal such as a mobile phone are examples of the user device 10. The display device 19 is an example of a display unit.

The CPU 11 executes various programs that are loaded according to purposes of the user device 10. Furthermore, the CPU 11 executes the various programs when power is supplied to the user device 10, that is, the user device 10 is powered on. The program, which is executed when the power is supplied, includes an application (hereinafter referred to as "resident application") for collecting the usage status information of the user device 10. The resident application monitors events related to the operations of an OS and various applications, collects, and stores the events as log data. The CPU 11 is an example of a processing circuit such as a processor. A Micro-Processing Unit (MPU), a Field-Programmable Gate Array (FPGA), and a wired logic are other examples of the processing circuit. The RAM 13 is a main memory of the CPU 11. The RAM 13 is a volatile storage device that temporally stores programs executed by the CPU 11 and data referred to by the CPU 11. The chipset 12 includes a control circuit for an interface between the CPU 11 and other units and a register that controls the units. For example, the chipset 12 may correspond to a General Purpose Interface (GPI) as a general interface. The BIOS-ROM 14 stores a Basic Input/Output System (BIOS). The BIOS is a Basic Input/Output System (program) that performs basic Input/Output processing with hardware. The power supply device 15 supplies the power to the units of the user device 10. The HDD 16 is an example of a nonvolatile storage device. The HDD 16 stores an Operating System (OS) and programs to be executed on the OS. The HDD 16 stores a client ID that is used to identify the user. For example, one or more input devices such as a mouse, a keyboard, and the like of a computer are collectively referred to as the input device 17. The communication interface device 18 includes an interface circuit for communicating with the purchased product registering server 20, the usage status collecting server 30, and the information providing servicer 40 through the Internet or a Local Area Network (LAN). The communication interface device 18 is an example of a communication device. The communication interface device 18 is communicable with the purchased product registering server 20, the usage status collecting server 30, and the information providing servicer 40, and any type of protocol used for the communication is applicable. The display device 19 includes, for example, a Liquid Crystal Display (LCD) monitor, which includes a thin film transistor arranged in a matrix shape by a pixel unit, and a drive circuit for driving the thin film transistor. For example, the display device 19 displays image data, which is given based on an instruction from the CPU 11, on the LCD monitor.

(1-3) Configuration of Information Providing Server 40

Figure 3:
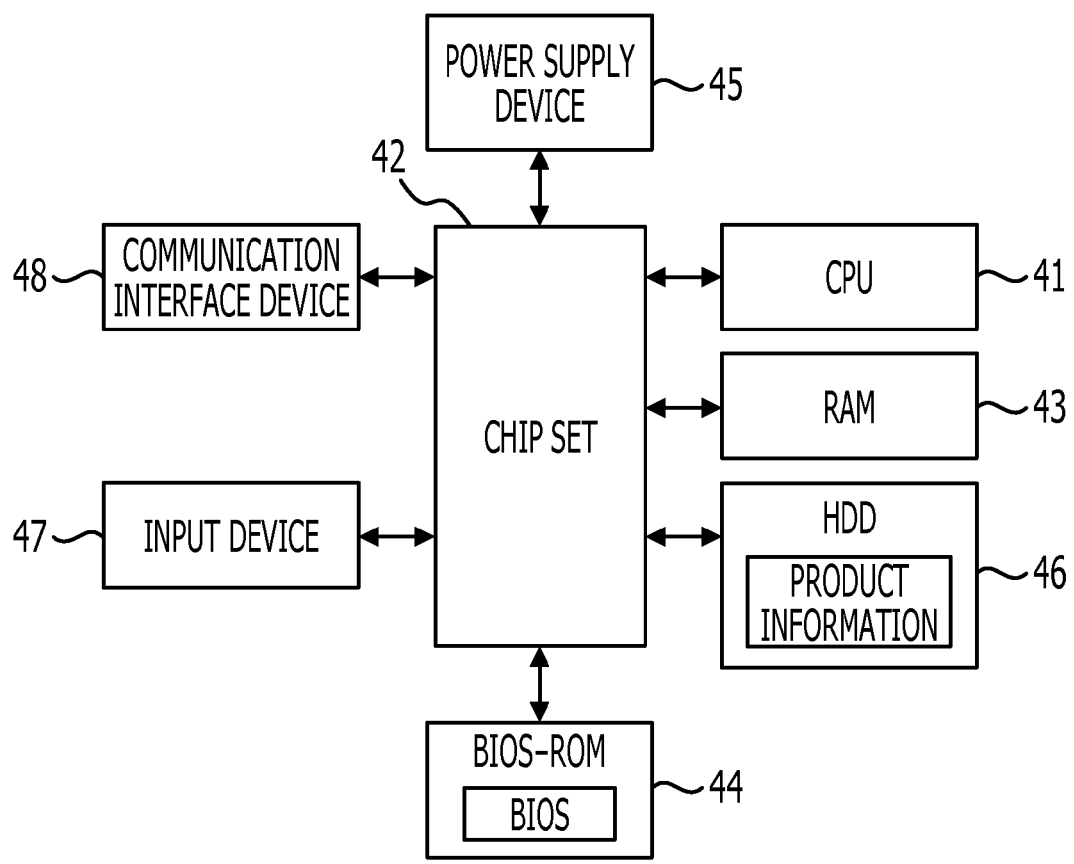
FIG. 3 is a block diagram illustrating a configuration of an information providing server according to the first embodiment.

FIG. 3 is a block diagram illustrating a configuration of the information providing server 40 according to the embodiment. As illustrated in FIG. 3, the information providing server 40 includes, for example, a Central Processing Unit (CPU) 41, a chipset 42, a Random Access Memory (RAM) 43, a BIOS-ROM 44, a power supply device 45, a Hard Disk Drive (HDD) 46, an input device 47, and a communication interface device 48. By using a data bus and a control bus, the chipset 42 is coupled to be data-communicable with the units inside the information providing server 40. The CPU 41 is an example of an obtaining unit, an extracting unit, and a communication control unit. The HDD 46 is an example of a product information storage device.

The CPU 41 executes various programs that are loaded according to purposes of the information providing server 40. The CPU 41 generates the obtaining unit, the extracting unit, and the communication control unit as a software module by calling up a program stored in the HDD 46 or the ROM. Therefore, when the CPU 41 executes the program, the CPU 41 acts as the obtaining unit, the extracting unit, and the communication control unit. The CPU 41 is an example of the processing circuit. The MPU, the FPGA, the wired logic, and the like are other examples of the processing circuit. The chipset 42 includes a control circuit for the interface between the CPU 41 and the other units and a register that controls the units. For example, the chipset 42 may correspond to the GPI as a general interface. The RAM 43 is a main memory of the CPU 41. The RAM 43 is a volatile storage device that temporally stores the programs executed by the CPU 41 and the data referred to by the CPU 41. The BIOS-ROM 44 stores the BIOS. The BIOS is a Basic Input/Output System that performs the basic Input/Output processing with the hardware. The power supply device 45 supplies the power to the units of the information providing server 40. The HDD 46 is an example of the nonvolatile storage device. The HDD 46 stores the OS and the programs to be executed on the OS. The HDD 46 stores product information of each product. The product information represents the product information as program content in the form of functions, capabilities, and performance metrics of the product in a plurality of items. FIG. 4 is an example of a data configuration of the product information. FIG. 4 illustrates the product information of various aspects of a personal computer as an example of the product. As illustrated in FIG. 4, from among the plurality of items, the contents of the items other than the items of the product name and the product type are indicated by dotted lines. Actually, the contents of the items include product details, including technical descriptions or specifications, which would include letters, numbers, image information, and the like. The communication interface device 48 includes an interface circuit that is used to communicate with the user device 10, the purchased product registering server 20, and the usage status collecting server 30 through the Internet or the LAN. The communication interface device 48 is an example of the communication device. The communication interface device 48 is typically communicable with the purchased product registering server 20, the usage status collecting server 30, and the information providing server 40, and any type of protocol used for the communication is applicable.

(1-4) Configuration of Purchased Product Registering Server 20

Figure 5:
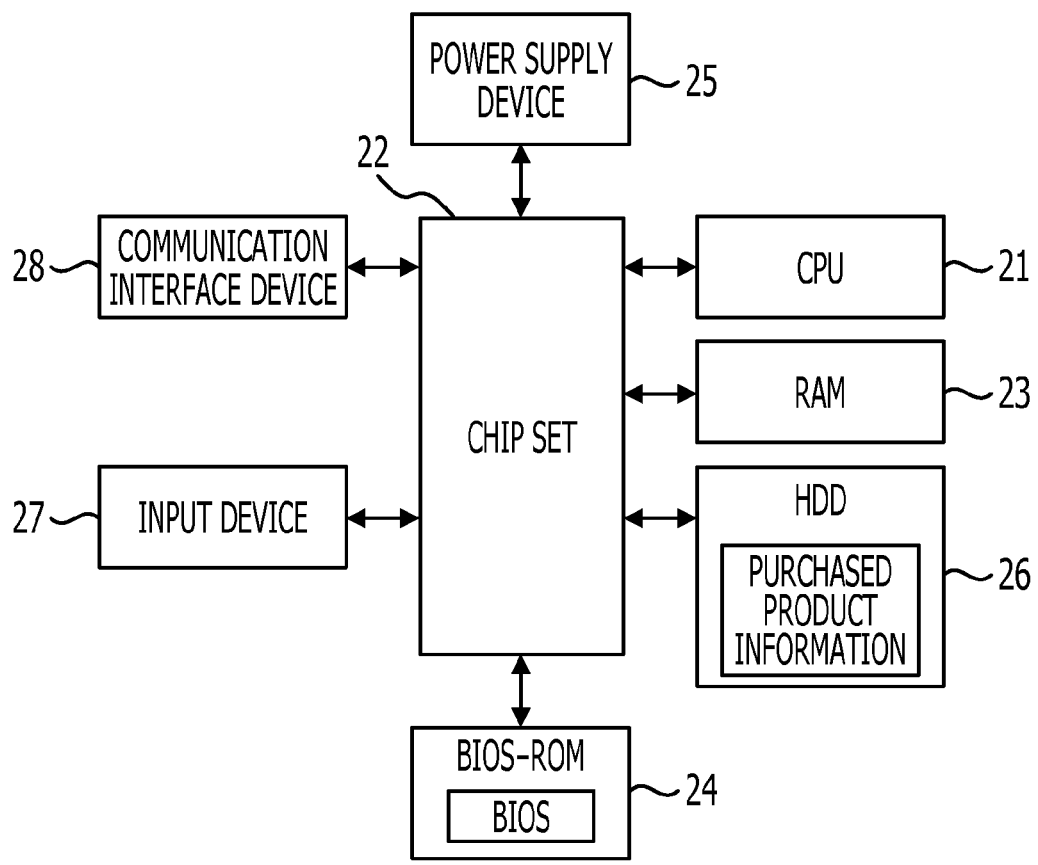
FIG. 5 is a block diagram illustrating a configuration of a purchased product registering server according to the first embodiment.

FIG. 5 is a block diagram illustrating a configuration of the purchased product registering server 20 according to the first embodiment. As illustrated in FIG. 5, the purchased product registering server 20 includes, for example, a CPU 21, a chipset 22, a RAM 23, a BIOS-ROM 24, a power supply device 25, a HDD 26, an input device 27, and a communication interface device 28. By using a data bus and a control bus, the chipset 22 is coupled to be data-communicable with the units inside the purchased product registering server 20. The communication interface device 28 includes an interface circuit that communicates with another device through the Internet or the LAN. The communication interface device 28 is an example of the communication device. The HDD 26 is a nonvolatile storage device. The HDD 26 stores the OS and the programs to be executed on the OS. The HDD 26 stores the purchased product information. The purchased product information represents association between a product purchaser and a purchased product. FIG. 6 is an example of the data configuration of the purchased product information. The purchased product information includes the client ID, the name and type name of the purchased product. The purchased product information may include the name and address of the product purchaser, the product ID used to individually recognize the purchased product, the type ID used to identify the type of the purchased product, and the like. The CPU 21 loads and executes the OS and the other programs, which are stored in the HDD 26, in the RAM 23. When executing the OS and the other programs, the CPU 21 uses the purchased product information and the other data stored in the HDD 26 if desired. The CPU 21 is an example of the processing circuit. The MPU, the FPGA, the wired logic, and the like are other examples of the processing circuit. The details of the units inside the purchased product registering server 20 are equivalent to the information providing server 40.

(1-5) Configuration of Usage Status Collecting Server 30

Figure 7:
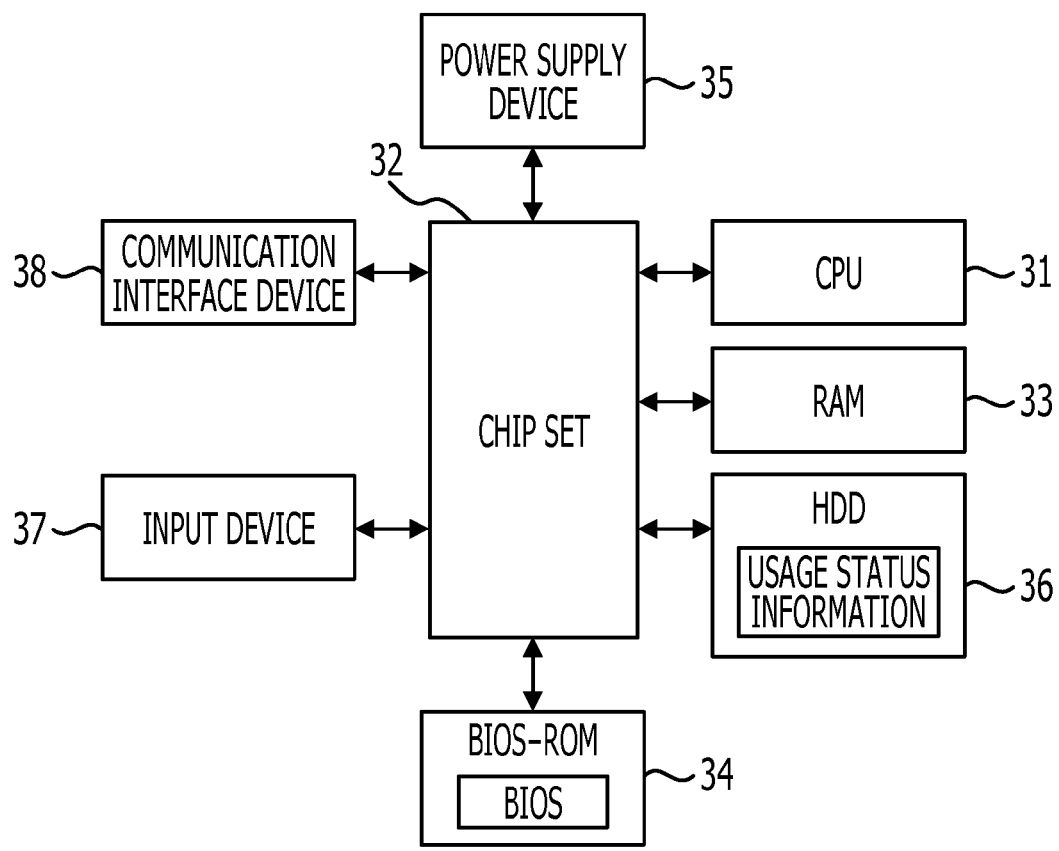
FIG. 7 is a block diagram illustrating a configuration of a usage status collecting server according to the first embodiment.

FIG. 7 is a block diagram illustrating a configuration of the usage status collecting server 30 according to the first embodiment. As illustrated in FIG. 7, the usage status collecting server 30 includes, for example, a CPU 31, a chipset 32, a RAM 33, a BIOS-ROM 34, a power supply device 35, a HDD 36, an input device 37, and a communication interface device 38. By using a data bus and a control bus, the chipset 32 is coupled to be data-communicable with the units inside the usage status collecting server 30. The HDD 36 is a nonvolatile storage device. The HDD 36 stores the OS and the programs to be executed on the OS. The HDD 36 stores the usage status information for each client ID. The usage status information represents the usage status of the product possessed by the user. FIGS. 8 and 9 illustrate examples of the data configuration of the usage status information. The CPU 31 loads and executes the OS and the other programs, which are stored in the HDD 36, in the RAM 33. When executing the OS and the other programs, the CPU 31 uses the usage status information and other data stored in the HDD 36 if desired. The CPU 31 is an example of the processing circuit. The MPU, the FPGA, the wired logic, and the like are other examples of the processing circuit. The communication interface device 38 includes an interface circuit that is used to communicate with another device through the Internet or the LAN. The communication interface device 38 is an example of the communication device. The usage status information illustrated in FIG. 8 represents the content of the log data held by the resident application of the possessed product (the user device 10) of the user. The content of the log data includes an execution status of the application, a usage status of the function of the application, a usage status of an internal coupling apparatus or an external coupling apparatus (for example, a removable media, an HDD, or the like), a usage status of the Internet (for example, a percent of the total capacity), and the like. An execution frequency of the application and a usage frequency of the function of the application are represented based on the execution status of the application and the usage status of the function of the application in the log data. The usage status information illustrated in FIG. 9 includes the content of the answers on the usage status of the possessed product on a questionnaire webpage provided by the usage status collecting server 30. The details of the units inside the usage status collecting server 30 are equivalent to the information providing server 40.

(1-6) Registration of Purchased Product

Figure 10:
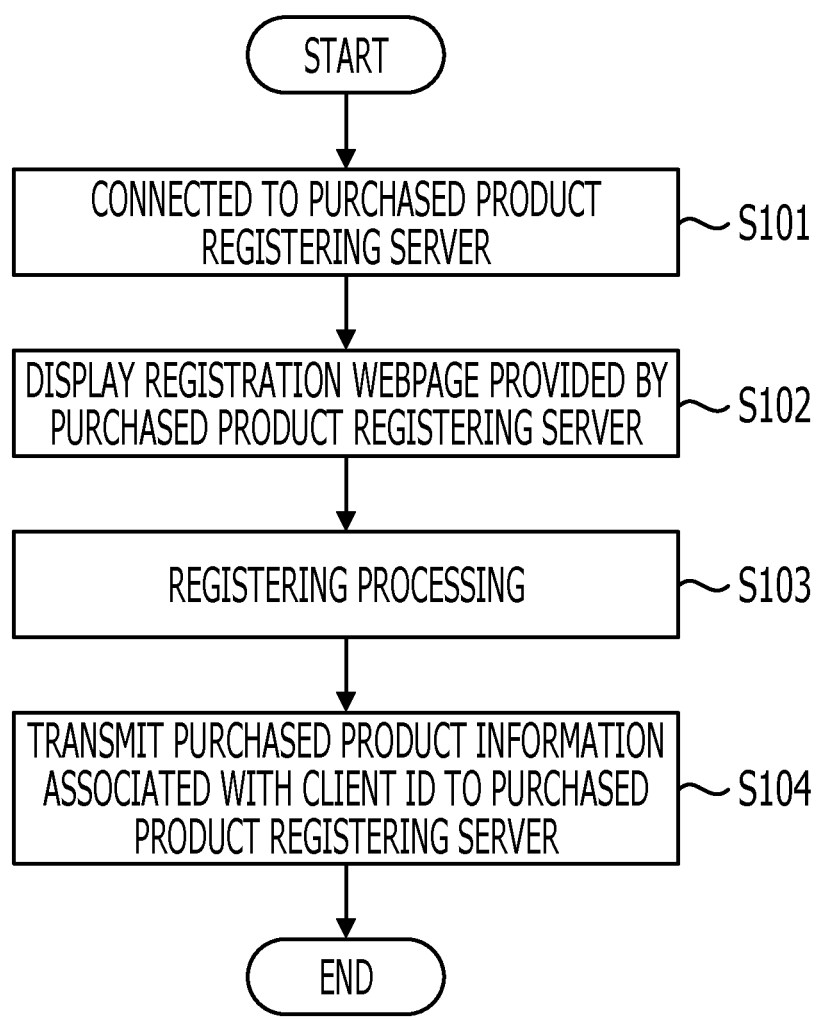
FIG. 10 is a flowchart illustrating registering processing of a purchased product according to the first embodiment.

With reference to FIG. 10, registering processing of the purchased product performed by the user device 10 will be described below. FIG. 10 is a flowchart illustrating the registering process for registering the purchased product. When the user uses the user device 10 to access a website of the purchased product registering server 20, the user device 10 is connected to the purchased product registering server 20 (Operation S101). At this time, the CPU 11 of the user device 10 displays a registration webpage provided by the purchased product registering server 20 on the display device 19 (Operation S102).

The registering processing of the purchased product is performed (Operation S103). According to the above-described registering processing, the user uses the input device 19 to input the purchased product information related to the purchased product (the user device 10) in a prescribed field provided on the registration webpage. If the user receives a transmission instruction after using the input device 19 to push down the transmission button provided on the webpage, the CPU 11 associates the purchased product information of the user with the client ID stored in the HDD 16. The CPU 11 transmits the purchased product information to the purchased product registering server 20 (Operation S104). On the other hand, when receiving the purchased product information from the user device 10, the CPU 21 of the purchased product registering server 20 stores the received purchased product information in the HDD 26. The above-described process describes a case where the user registers the purchased product. The similar registering processing may be performed by, for example, a store selling the product or a manufacturing company providing maintenance services of the purchased product.

(1-7) Registration of Usage Status Information

Figure 11:
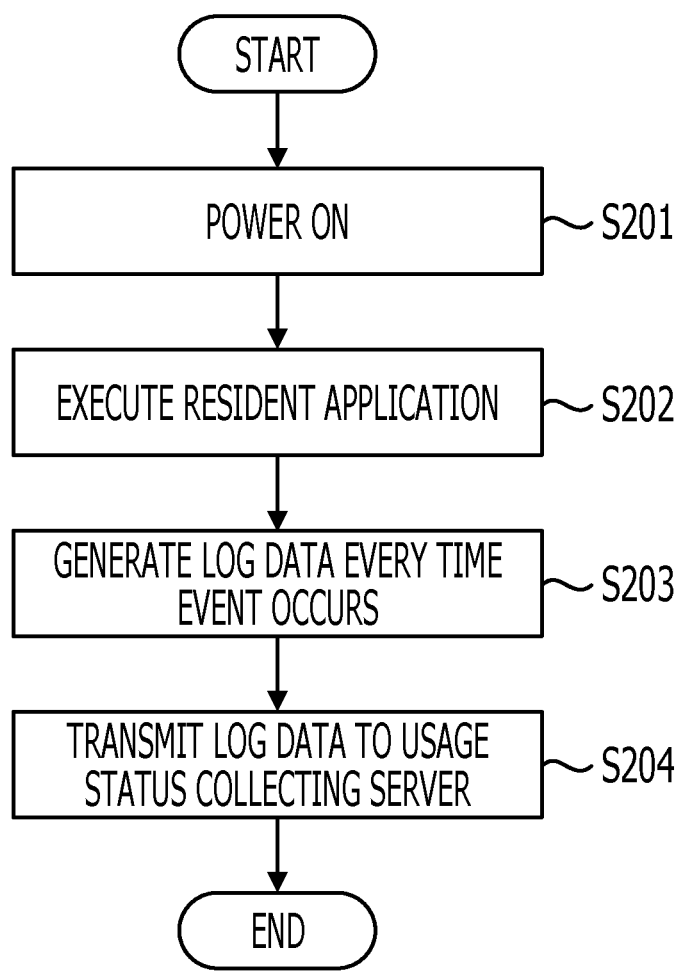
FIG. 11 is a flowchart illustrating the registering processing of the usage status information according to the first embodiment.

With reference to FIG. 11, the registering processing of the usage status information performed by the user device 10 will be described below. When the power is supplied to the user device 10 (Operation S201), the CPU 11 of the user device 10 executes various programs provided on the user device 10. At this time, the CPU 11 executes the resident application that collects the usage status information (Operation S202). During the operation of the resident application, the CPU 11 generates log data every time an event related to the operation of the OS and the various applications occurs (Operation S203). The generated log data is associated with the client ID stored in the HDD 16 and then is stored in the HDD 16. The CPU 11 transmits the log data stored in the HDD 16 to the usage status collecting server 30 every time a prescribed time (for example, 24 hours) elapses (Operation S204). The CPU 11 may transmit the log data to the usage status collecting server 30 every time the event occurs. On the other hand, when receiving the usage status information from the user device 10, the CPU 21 of the purchased product registering server 20 stores the received usage status information in the HDD 36. On the website provided by the usage status collecting server 30, if the user answers the questionnaire about the usage status of the possessed product, the CPU 31 of the usage status collecting server 30 generates the usage status information as illustrated in FIG. 9 based on the answer results. The CPU 31 stores the generated usage status information in the HDD 36.

Figure 12:
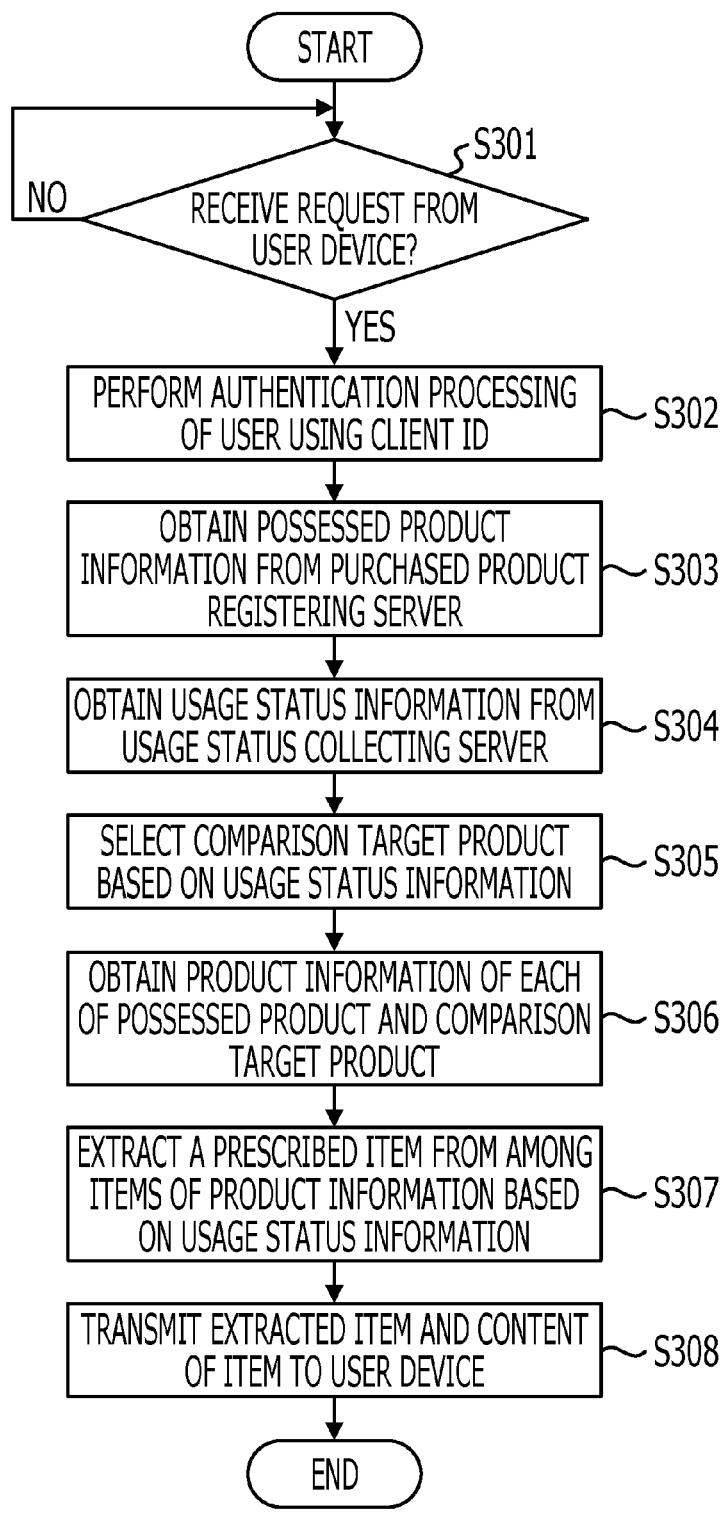
FIG. 12 is a flowchart illustrating information providing processing of a possessed product and a comparison target product according to the first embodiment.

(1-8) Provision of Product information of Possessed Product and Comparison Target Product With reference to FIG. 12, processing for providing the product information of the possessed product and the comparison target product will be described below. FIG. 12 is a flowchart illustrating the information providing process for providing information related to the possessed product and the comparison target product. When receiving a request from the user device 10 (YES in Operation S301), the CPU 41 of the information providing server 40 performs authentication processing of the user using the client ID with the user device 10 (Operation S302). In this case, the request from the user device 10 is, for example, a coupling request of communication with the information providing server 40 and a provision request of the product information through a webpage of a website provided by the information providing server 40. In the authentication processing, the client ID and authentication information such as a password set in advance by the user may be used.

After the authentication processing of the user ends normally, the CPU 41 obtains the possessed product information of the user from the purchased product registering server 20 (Operation S303). The CPU 41 requests the purchased product registering server 20 to transmit the product registration information associated with the client ID used for the authentication process in Operation S302. On the other hand, according to the request from the information providing server 40, the CPU 21 of the purchased product registering server 20 obtains the product registration information associated with the client ID and transmits the obtained product registration information to the information providing server 40. The CPU 41 obtains the usage status information of the possessed product of the user from the usage status collecting server 30 (Operation S304). The CPU 41 requests the usage status collecting server 30 to transmit the usage status information associated with the client ID. On the other hand, according to the transmission request from the information providing server 40, the CPU 30 of the usage status collecting server 30 obtains the usage status information associated with the client ID from the HDD 36 and transmits the obtained usage status information to the information providing server 40.

The CPU 41 selects the comparison target product of the possessed product based on the obtained usage status information (Operation S305). The processing content when the comparison target product is selected based on the usage status information will be described. The CPU 41 uses the usage status information to calculate numerical data indicating the usage status for each of the following items (a) to (f). The items (a) to (f) are examples, and the usage of the items is not limited to the indication of the usage status.

(a) Usage status of application (usage frequency, usage time, and the like)

(b) CPU use amount (c) Memory use amount (d) HDD use amount (e) Use amount of optical media and removable media (use frequency, use time, and the like)

(f) Use rate of line connected to the Internet

Threshold values are set in advance for each of the items (a) to (f). According to the multidimensional matrix generated based on the items, the CPU 41 selects, as the comparison target product, the product corresponding to the numerical data indicating the usage status that is equal to or larger than the threshold value. The threshold values of the items are stored in the HDD 46 of the information providing server 40. The threshold values may be set based on an average value of the numerical data calculated from the usage status information of other users. Here, for example, with reference to FIG. 13, a selecting method of the comparison target product in a case where the multidimensional matrix is simplified into a two-dimensional matrix will be described below. FIG. 13 is an example of the two-dimensional matrix for selecting the comparison target product. FIG. 13 illustrates a two-dimensional matrix using the item (b) CPU use amount and the item (c) Memory use amount from among the items (a) to (f). Regarding the CPU use amount, three threshold values are set: "70 percent or more," "40 percent or more," and "Less than 40 percent." Regarding the memory use amount, three threshold values are set: "4 GB or more," "2 GB or more," and "Less than 2 GB." Different products are allocated in rows and columns divided by the threshold values. For example, if the CPU use amount calculated from the usage status information is 80 percent and if the memory use amount is 5 GB, a product A is selected as the comparison target product. If the CPU use amount is 30 percent and if the memory use amount is 1 GB, a product F is selected as the comparison target product. Accordingly, the comparison target product is selected based on the usage status information.

The CPU 41 obtains the product information of each of the possessed products and the comparison target products from the HDD 46 (Operation S306). The CPU 41 obtains the product information of the possessed product by using the possessed product information obtained in Operation S303. The CPU 41 obtains the product information of the comparison target product based on the product name, the product type, and the like of the comparison target product selected in Operation S305. The product information of each of the possessed products and the comparison target products is illustrated in FIG. 14. FIG. 14 illustrates an example of the product information of the possessed product and the comparison target product.

Based on the usage status information, the CPU 41 extracts a prescribed item from among the items of the product information of each of the possessed product and the comparison target product (Operation S307). As a result, the display items of the product information may be narrowed. The CPU 41 extracts the item by using the following methods (A) and (B). The methods (A) and (B) are included as examples of methods which may be used, and the extracting method of the items is not limited to the methods (A) and (B).

(A) Method for using Extracted Item List that is Set for Each Application

Figure 15:
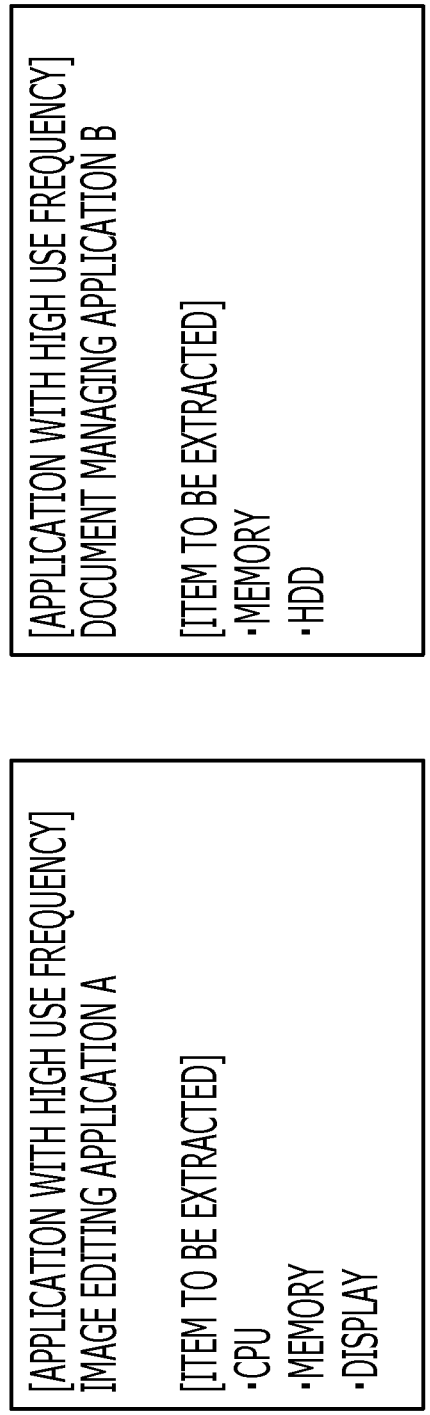
FIG. 15 is an example of an extracted item list according to the first embodiment.

With reference to FIG. 15, the method (A) will be described below. FIG. 15 illustrates an example of an extracted item list. The extracted item list is stored in the HDD 46 of the information providing server 40, and the items extracted from the items of the product information are set for each application. By using the numerical data corresponding to the item "(a) Usage status of application (usage frequency, usage time, and the like)" from among the numerical data indicating the usage status, the CPU 41 specifies an application with a higher usage frequency. For example, an application that is used more than a prescribed number of times (for example, five times) for the last one week and an application of which the total usage time exceeds 100 hours are specified as the application with a high usage frequency. Determining whether or not the usage frequency of the application is high may be made by using the threshold value used to determine the usage frequency. From among the items of the product information, the CPU 41 extracts the item that is set in the extracted item list corresponding to the application specified as the application with a high usage frequency. For example, in FIG. 15, if an image application A is specified as the application with a high usage frequency, the CPU 41 extracts three items: "CPU," "Memory," and "Display" from among the items of the product information.

(B) Method for using Numerical Data Corresponding to the Above-Described Items (b) to (f) from Among the Numerical Data Indicating the Usage Status From among the numerical data corresponding to the above-described items (b) to (f), the CPU 41 extracts the item of which the numerical data is equal to or larger than a prescribed threshold value. For example, if the threshold value set to the item "(b) CPU use amount" is 60 percent, the item "CPU" is extracted from among the items of the product information when the CPU use amount calculated from the usage status information is 80 percent.

According to the extracting processing of the item in Operation S307, one of the method (A) and the methods (B) or both the method (A) and the method (B) may be used. If the number of the extracted items is larger than a prescribed number (for example, five), from among the items of the product information of each of the processed product and the comparison target product, the prescribed number of items may be extracted in the descending order of the difference of the content (numeral) between the possessed product and the comparison target product. In this manner, for example, four items are extracted: "Product name," "CPU," "Memory," and "Display" from among the items of the product information illustrated in FIG. 14.

The CPU 41 transmits the extracted items and the contents of the items to the user device 10 (Operation S308). On the other hand, the CPU 11 of the user device 10 displays the information received from the information providing server 40 on the display device 19. The product information displayed on the display device 19 is illustrated in FIG. 16, for example. FIG. 16 illustrates an example of the product information of the possessed product and the comparison target product displayed on the display device 19 of the user device 10. Therefore, the contents of the possessed product are narrowed according to the usage status of the possessed product of the user and of the comparison target product and then displayed on the display device 19 of the user device 10.

(1-9) Provision of Product Information of Possessed Product and Comparison Target Product (Alternative Example)

Figure 17:
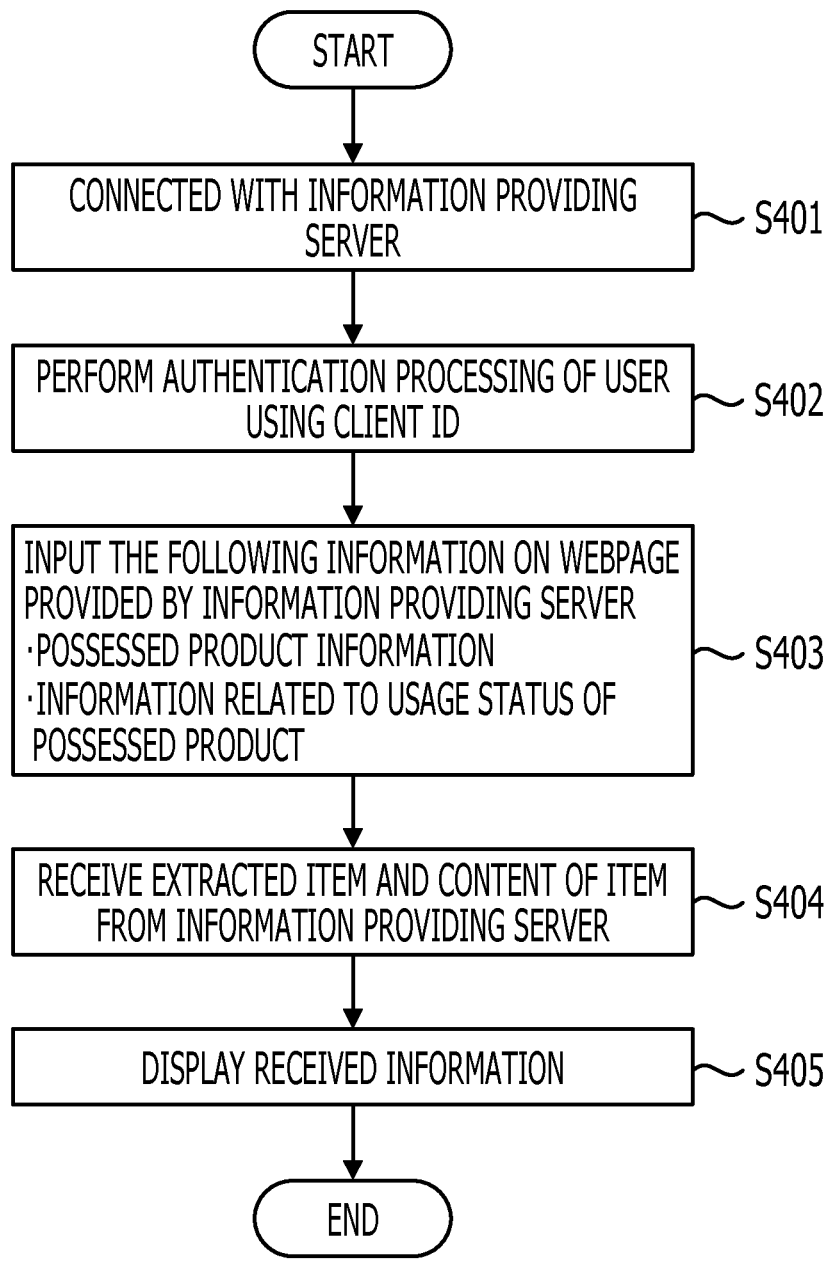
FIG. 17 is a flowchart illustrating an alternative example of the information providing processing according to the first embodiment.

With reference to FIG. 17, an alternative example of processing for providing the product information of the possessed product and the comparison target product will be described below. FIG. 17 is a flowchart illustrating the alternative example of the information providing processing. According to the alternative example, by inputting the possessed product information and the like, the user obtains the product information of the possessed product and the comparison target product. The information providing processing according to the alternative example will be described. When the user uses the user device 10 to access the website of the information providing server 40, the user device 10 is connected to the information providing server 40 (Operation S401). The CPU 11 of the user device 10 performs the authentication processing of the user using the client ID with the information providing server 40 (Operation S402). On the webpage provided by the information providing server 40, the user uses the input device 17 to input the information related to the possessed product information (for example, the product name, the product type, and the like) and/or the usage status of the possessed product (Operation S403). In this case, the information related to the usage status of the possessed product is an answer or the like of the questionnaire about the usage status illustrated in FIG. 9. By transmitting the input information to the information providing server 40, the CPU 11 requests the information providing server 40 to transmit the product information of the possessed product and the comparison target product. In Operation S403, the user may specify the comparison target product.

On the other hand, when obtaining the possessed product information from the user device 10, the CPU 41 of the information providing server 40 performs the processing of Operation S304 illustrated in FIG. 12. When receiving the extracted items and the content of the items from the information providing server 40 from among the items of the product information of the possessed product and the comparison target product (Operation S404), the CPU 11 of the user device 10 displays the received information on the display device 19 (Operation S405). Accordingly, for example, even if the purchased product registering server 20 does not store the product purchase information or the usage status collecting server 30 does not store the usage status information of the possessed product, the contents of each of the possessed product of which the display items are narrowed according to the usage status of the possessed product of the user and of the comparison target product are displayed on the display device 19 of the user device 10.

As described above, according to the first embodiment, the contents of each of the possessed product of which the display items are narrowed according to the usage status of the possessed product of the user and of the comparison target product are displayed on the display device 19 of the user device 10. Therefore, when the user compares the possessed product with the comparison target product, the user may easily compare the products based on the content of the products corresponding to the displayed items. As a result, the user may easily understand the improvements, differences, and the like of the comparison target product with respect to the possessed product, so that the appealing effect of the comparison target product is improved.

According to the first embodiment, since the product information of the comparison target product from among the product information stored in the HDD 46 is obtained based on the usage status information, the product according to the usage status of the possessed product of the user is selected as the comparison target product. The product information of the comparison target product suitable for a usage form of the user is provided to the user, so that the appeal of the comparison target product toward the user is improved.

(2) Second Embodiment

An information providing device, an information providing method, a program stored in an information providing system and a non-temporal storage medium will be described below. A difference between the first embodiment and the second embodiment is that the comparison information, which has the contents of the items extracted by the extracting unit from among the items of the product information of each of the possessed product and the comparison target product and has the information indicating the comparison of the possessed product and the comparison target product with respect to the contents of the extracted items, is generated, and the generated comparison information is transmitted to the user device 10. Therefore, the appealing effect of the comparison target product is further improved. The configuration of the second embodiment, which is different from the configuration of the first embodiment, will be described.

(2-1) Configuration of Information Providing Server 40

Figure 18:
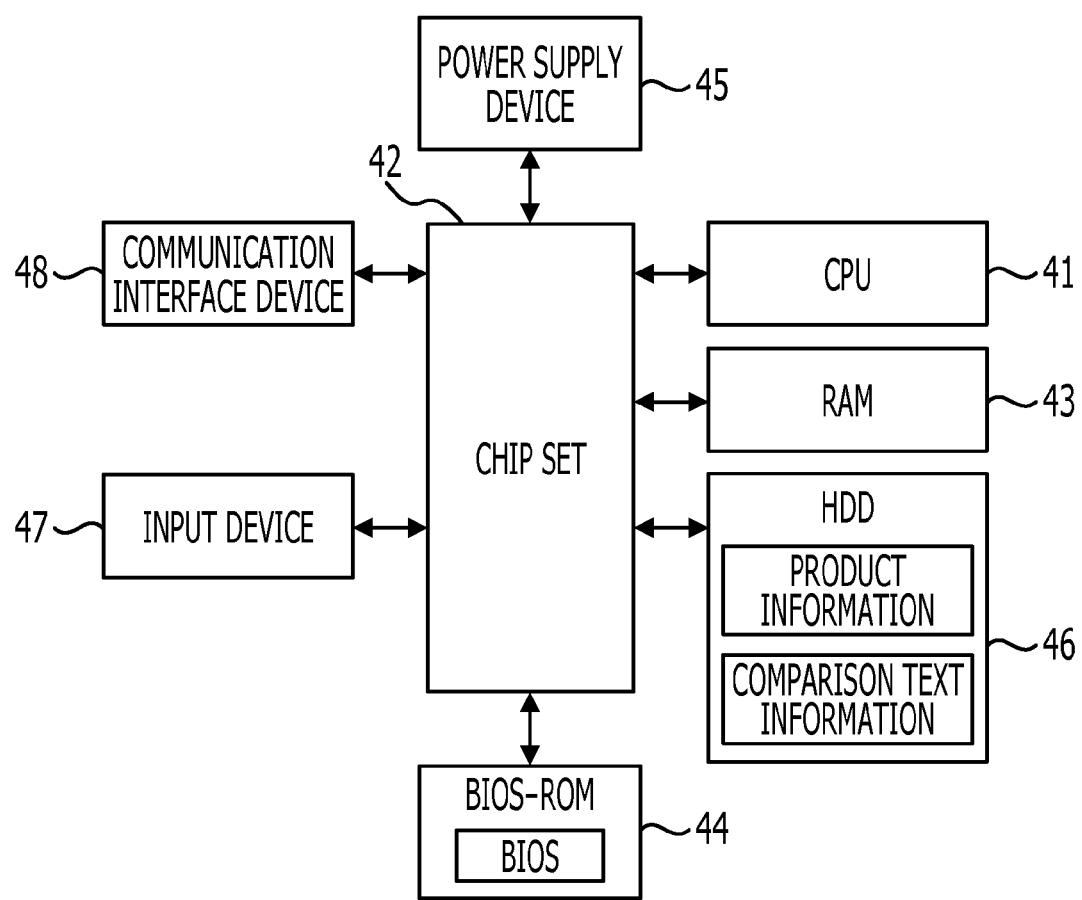
FIG. 18 is a block diagram illustrating the configuration of the information providing server according to the second embodiment.

FIG. 18 is a block diagram illustrating a configuration of the information providing server 40 according to the second embodiment. As illustrated in FIG. 18, the hardware configuration of the information providing server 40 is equivalent to the first embodiment. The CPU 41 executes various programs loaded according to the purpose of the information providing server 40. By calling up and starting the program stored in the HDD 46 or the ROM, the CPU 41 generates the obtaining unit, the extracting unit, the communication control unit, and the generating unit as a software module. Therefore, when the CPU 41 executes the program, the CPU 41 substantively has the functions of the obtaining unit, the extracting unit, the communication control unit, and the generating unit. The HDD 46 stores comparison text information. FIG. 19 illustrates an example of the data configuration of the comparison text information. As illustrated in FIG. 19, the comparison text information includes a comparison text indicating comparison results of the possessed product and the comparison target product for each combination of the possessed product and the comparison target product. The comparison text information is stored in the HDD 46 for each item of the product information. By using the comparison text, the comparison of the content of the possessed product with the content of the comparison target product is described by letters. Image information and the like may be used as the information indicating the comparison results of the possessed product and the comparison target product.

Figure 20:
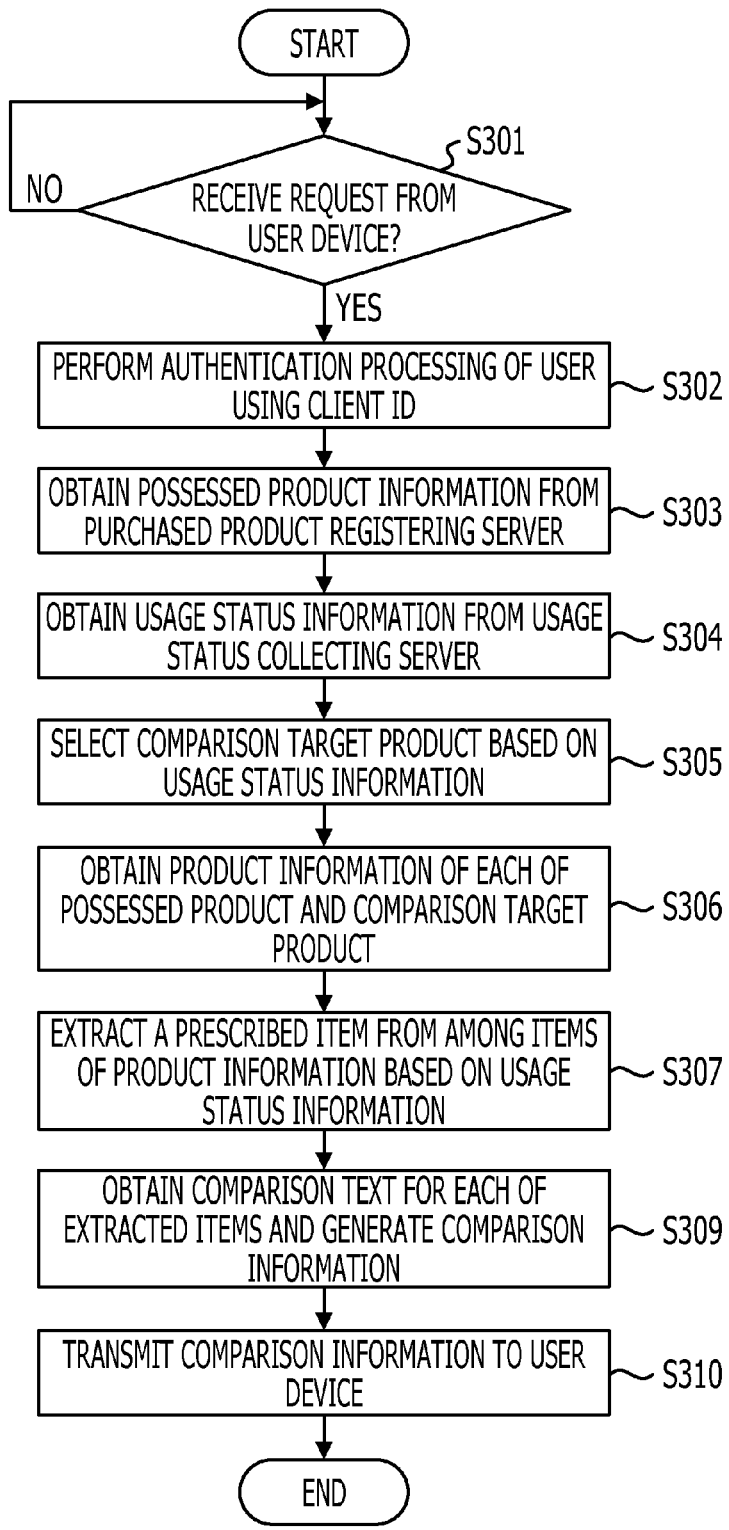
FIG. 20 is a flowchart illustrating a main unit of the information providing processing of the possessed product and the comparison target product according to the second embodiment.

(2-2) Provision of Product Information of Possessed Product and Comparison Target Product With reference to FIG. 20, the process for providing the product information of the possessed product and the comparison target product, which is performed by the information providing server 40, will be described below. FIG. 20 is a flowchart illustrating a main unit of the information providing processing of the possessed product and the comparison target product according to the second embodiment. In FIG. 20, the processing content from Operation S301 to Operation S307 is equivalent to the processing content from Operation S301 to Operation S307 illustrated in FIG. 12. After the processing in Operation S307 is performed, the CPU 41 of the information providing server 40 obtains the comparison text for each of the items extracted in Operation S307 and generates the comparison information (Operation S309). As described with reference to FIG. 19, for example, if the extracted item is "CPU," the content of the "CPU" of the possessed product is "Processor type X," and the content of the "CPU" of the comparison target product is "Processor type Y," the comparison text "Approximately 1.5 times faster!" is obtained. The CPU 41 generates the comparison information that includes the extracted item ("CPU"), the content of the extracted item ("Processor type X"), and the obtained comparison text ("Approximately 1.5 times faster!").

The CPU 41 transmits the generated comparison information to the user device 10 (Operation S310). On the other hand, the CPU 11 of the user device 10 displays the comparison information, which is received from the information providing server 40, on the display device 19. The product information displayed on the display device 19 is illustrated as in FIG. 21. FIG. 21 illustrates an example of the product information of the possessed product and the comparison target product displayed on the display device 19 of the user device 10. Accordingly, the display device 19 of the user device 10 displays the contents of each of the possessed product of which the display items are narrowed and of the comparison target product and the information of the compared contents.

The comparison information may be generated without using a comparison text. For example, when the product information of the possessed product and the comparison target product is indicated by numerals, the CPU 41 may calculate the size and ratio of the numerals and may generate the comparison information by using the text that includes the calculated value (for example, "20 percent increase," "Approximately two times larger," and the like). When the size and the like of the product are indicated by numerals, the CPU 41 may generate the comparison information by using simple expressions and metaphors that may be easily imagined by users such as "sized for your business bag," for example. If the product information indicates a specification, a function, and the like, the CPU 41 may generate the comparison information by using expressions and metaphors that are easily imagined by the user. For example, when the content of the product information is indicated as "Superfine Liquid Crystal," the CPU 41 may use an expression such as "Still image and video are beautiful." The above-described program is stored in a non-temporal storage medium that is readable by the user device 10 and the computer such as the servers 20, 30, and 40. If the computer and the like read and execute the program stored in the above-described non-temporal storage medium, the above-described function is provided. In this case, the storage medium, which is readable by the computer and the like, may store the information such as a program and data by functioning that is electric, magnetic, optic, mechanical, or chemical, and then may read the stored information from the computers and the like. From among the above-described storage mediums, the storage medium that is detachable from the computer and the like is, for example, a flexible disk, an optical magnetic disk, a CD-ROM, a CD-R/W, a DVD, a Blu-ray Disc, a DAT, an 8 mm tape, a memory card such as a flash memory, or the like. The storage medium fixed to the computers and the like is a hard disk, a ROM, or the like.

As described above, according to the second embodiment, the content of each of the possessed product and the comparison target product of which the displayed items are narrowed and the information of the compared content are displayed on the display device 19 of the user device 10. Therefore, when the user compares the possessed product with the comparison target product, the user may easily compare the products based on the contents of the products and the information obtained by comparing the products. As a result, the user may easily understand the improvements and differences of the comparison target product with respect to the possessed product, so that the appeal of the comparison target product is further improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An information providing device comprising:
    a communication device;
    a storage device; and
    a processing circuit configured to execute a program including a process stored in the storage device, the process including:
        obtaining a possessed product information, which indicates a possessed product of a user, and a usage status information, which indicates a usage status of the possessed product, the possessed product information being obtained based on a request received from a user device operated by the user through the communication device,
        obtaining a first product information corresponding to the obtained possessed product information and a second product information of a comparison target product as a target of comparison of the possessed product, the first product information and the second product information including product details of the possessed product and product details of the comparison target product, respectively, described in first and second lists of product details items, respectively,
        extracting a product detail item from each of the first and second lists of product detail items of the first product information and second product information, respectively, based on the obtained usage status information, and
        transmitting comparison content corresponding to the extracted product detail items to the user device.

2. The information providing device according to claim 1, wherein the second product information is obtained based on the obtained usage status information.

3. The information providing device according to claim 1, wherein the process further comprises:
    generating a comparison information that includes the extracted product detail items and information indicating a comparison of the possessed product and the comparison target product with respect to the extracted product detail items, and
    wherein transmitting the comparison content comprises transmitting the generated comparison information to the user device.

4. The information providing device according to claim 1, wherein the obtaining of the first product information and the second product information comprises obtaining the first product information and the second product information from a product storage device through the communication device, and
    wherein the product storage device stores the product information that includes the list of product detail items for each of the products.

5. The information providing device according to claim 1, wherein the obtaining of the usage status information comprises obtaining the usage status information from a usage status collecting device through the communication device, and
   wherein the usage status collecting device stores the usage status information indicating the usage status for each possessed product of the user.

6. An information providing method, the method comprising employing a processing circuit included in an information providing device, the information providing device also including a storage device, to execute a program stored in the storage device in order to cause the processing circuit to perform a process including:
   obtaining a possessed product information indicating the possessed product of a user and a usage status of the possessed product based on a request received from a user device operated by the user;
   obtaining a first product information corresponding to the obtained possessed product information and a second product information of a comparison target product as a target of the comparison of the possessed product, the first product information and the second product information including product details of the possessed product and product details of the comparison target product, respectively, described in first and second lists of product details items, respectively;
   extracting, using the processing circuit, a product detail item from each of the first and second lists of product detail items of the first product information and second product information, respectively, based on the obtained usage status information; and
   transmitting comparison content corresponding to the extracted product detail items to the user device.

7. The information providing method according to claim 6, wherein the second product information is obtained based on the obtained usage status information.

8. The information providing method according to claim 6, wherein the process further comprises:
   generating a comparison information that includes the extracted product detail items and information indicating a comparison of the possessed product and the comparison target product with respect to the extracted product detail items, and
   wherein transmitting comparison content comprises transmitting the generated comparison information to the user device.

9. The information providing method according to claim 6, wherein the obtaining the first product information and the second product information comprises obtaining the first product information and the second product information from a product storage device through a communication device included in the information providing device, and
   wherein the product storage device stores the product information that includes the list of product detail items for each of the products.

10. The information providing method according to claim 6, wherein the obtaining of the usage status information comprises obtaining the usage status information from a usage status collecting device through the communication device, and
   wherein the usage status collecting device stores the usage status information indicating the usage status for each possessed product of the user.

11. An information providing system, comprising:
   a user device; and
   an information providing device,
   the user device configured to transmit a request to the information providing device based on an operation of a user,
   the information providing device configured to execute a process, the process including:
   receiving the request,
   obtaining a possessed product information indicating a possessed product of a user and a usage status information indicating a usage status of the possessed product based on the request,
   obtaining a first product information corresponding to the obtained usage product information and a second product information as a comparison target product of the possessed product, the first product information and the second product information including product details of the possessed product and product details of the comparison target product, respectively, described in first and second lists of product details items, respectively,
   extracting a product detail item from each of the first and second lists of product detail items of the first product information and second product information, respectively, based on the obtained usage status information, and
   transmitting comparison content corresponding to the extracted product detail items to the user device.

12. The information providing system according to claim 11, wherein the information providing device obtains the second product information based on the obtained usage status information.

13. The information providing system according to claim 11, wherein the process further comprises:
   generating a comparison information that includes the extracted product detail items and information indicating a comparison of the possessed product and the comparison target product with respect to the extracted product detail items, and
   wherein transmitting comparison content comprises transmitting the generated comparison information to the user device.

14. The information providing system according to claim 11, further comprising:
   a product storage device which stores product information that includes the list of product detail items for each product,
   wherein the information providing device includes a communication device, and the process further comprises requesting product information of the possessed product and the comparison target product from the product storage device through the communication device, and
   wherein the product storage device transmits the first product information and the second product information according to the request from the information providing device.

15. The information providing system according to claim 11, further comprising:
   a usage status collecting device which stores the usage status information indicating the usage status for each possessed product of the user, and
   wherein the information providing device includes a communication device, and the process further comprises requesting the usage status information of the possessed product of the user to the usage status collecting device through the communication device, and wherein the usage status collecting device transmits the usage status information to the information providing device according to the request from the information providing device.

* * * * *